United States Patent [19]

Jones

[11] Patent Number: 5,218,685
[45] Date of Patent: Jun. 8, 1993

[54] SYSTEM FOR WRITE ONCE READ MANY OPTICAL STORAGE DEVICES TO APPEAR REWRITABLE

[75] Inventor: Philip W. Jones, New Berlin, Wis.

[73] Assignee: General Electric Company, Milwaukee, Wis.

[21] Appl. No.: 246,958

[22] Filed: Sep. 16, 1988

Related U.S. Application Data

[63] Continuation of Ser. No. 275, Jan. 2, 1987, abandoned.

[51] Int. Cl.[5] ............................................. G06F 12/12
[52] U.S. Cl. ..................... 395/425; 364/DIG. 1; 364/236.2; 364/243.4; 364/243; 364/248.1; 364/249.4
[58] Field of Search ... 364/200 MS File, 900 MS File; 369/53, 32, 59; 360/48, 32; 395/425, 400, 600

[56] References Cited

U.S. PATENT DOCUMENTS

| | | | |
|---|---|---|---|
| 3,949,369 | 4/1976 | Churchill, Jr. | 364/200 |
| 4,008,460 | 2/1977 | Bryant et al. | 364/200 |
| 4,315,312 | 2/1982 | Schmidt | 364/200 |
| 4,394,732 | 7/1983 | Swenson | 364/200 |
| 4,420,807 | 12/1983 | Nolta et al. | 364/200 |
| 4,463,424 | 7/1984 | Mattson et al. | 364/200 |
| 4,467,421 | 8/1984 | White | 364/200 |
| 4,545,044 | 10/1985 | Satoh et al. | 369/32 |
| 4,546,462 | 10/1985 | Koishi et al. | 369/53 |
| 4,587,643 | 5/1986 | Monen et al. | 369/32 |
| 4,603,382 | 7/1986 | Cole et al. | 364/200 |
| 4,682,318 | 7/1987 | Busby | 369/59 |
| 4,768,181 | 8/1988 | Ichinose et al. | 369/54 |
| 4,817,050 | 3/1989 | Komatsu et al. | 395/600 |
| 4,825,357 | 4/1989 | Ovies et al. | 364/200 |
| 4,835,686 | 5/1989 | Furuya et al. | 364/200 |
| 5,012,407 | 4/1991 | Finn | 395/700 |
| 5,034,914 | 7/1991 | Osterlund | 395/425 |

OTHER PUBLICATIONS

P. Youngworth, "Optical Filing: The Software," Systems International, May 1986, pp. 33-34.

*Primary Examiner*—Kevin A. Kriess
*Attorney, Agent, or Firm*—James O. Skarsten

[57] ABSTRACT

A system for Write Once Read Many (WORM) optical storage devices to appear rewritable uses magnetic disk storage and optical WORM storage subsystem. All new write operations are made to a magnetic cache storage which resides on the magnetic disk subsystem. A Least Recently Written (LRW) technique is used to determine which valid data in cache storage is the oldest and must be transfered to optical storage to make room for new data. In this manner all new write operations are performed to the magnetic cache storage and only the oldest valid data is transferred to optical disk, optimizing its use.

13 Claims, 4 Drawing Sheets

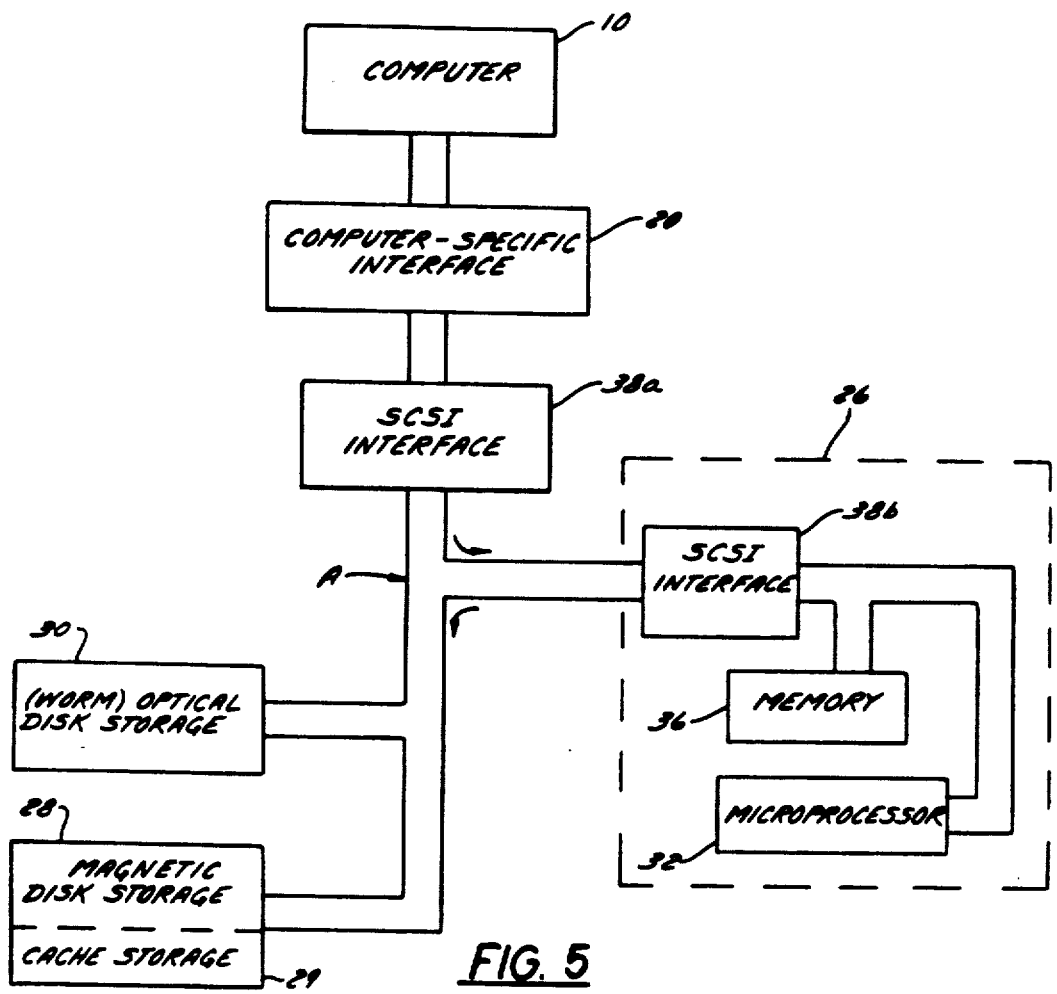
FIG. 5
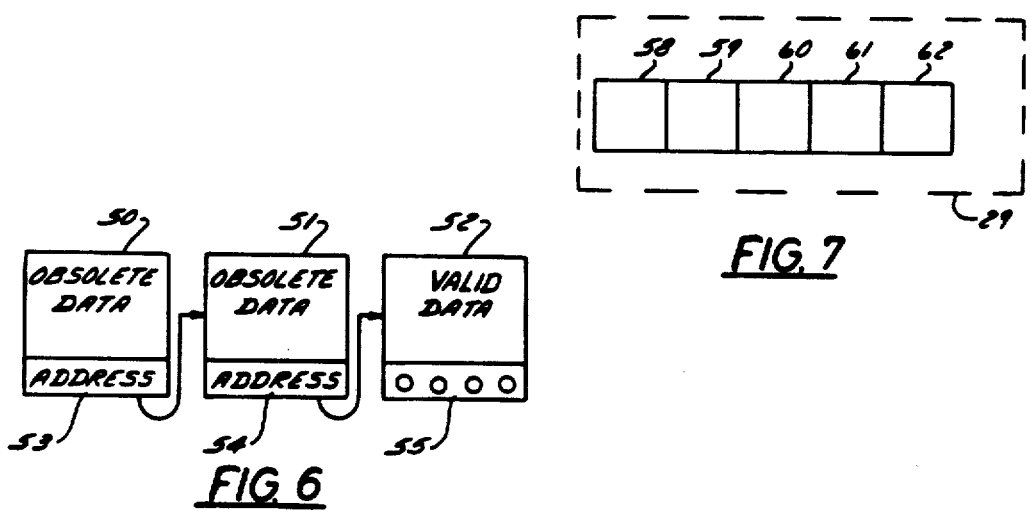
FIG. 7
FIG. 6

SYSTEM FOR WRITE ONCE READ MANY OPTICAL STORAGE DEVICES TO APPEAR REWRITABLE

This application is a continuation, of application Ser. No. 000,275, filed Jan. 2, 1987, now abandoned.

BACKGROUND OF THE INVENTION

This invention relates to method and apparatus to make a write once read many optical storage device appear to be rewritable.

Most presently used computer systems are designed to work with various types of data storage devices into which information can be written, read out, and rewritten many times. Examples of such devices include semiconductor memories and various magnetic storage media, such as magnetic disks and tape. While such storage devices have performed satisfactorily, the need for storing more and more information efficiently has driven the development of optical storage devices.

Currently available optical storage technology has provided a device with a characteristic commonly referred to as Write Once Read Many (WORM). Optical storage devices which are in the WORM family can only be written once because the medium is physically and permanently modified by the process of storing the information. The read process can then retrieve the information as many times as desired by detecting whether the medium has been modified or not. A problem created by WORM media is that most computer systems are not designed for a storage subsystem which restricts the number of times a "write" operation may be performed.

There are additional application problems caused by write-once media. Typical of these are computer operating systems which create many temporary files which are intermediate and transient to the operation of the system. Other problems concern the storage subsystem control structures which are constantly being modified and updated to reflect the current state of the subsystem. This kind of information is normally kept on the same subsystem which it controls. Thus, any time information is temporarily stored or stored information is modified, inefficient use of optical storage subsystems occurs because storage of temporary or intermediate files on WORM media wastes space. These problems stop optical storage devices from being used in normal ways. Virtually all current computer systems have not been designed to accommodate the restrictions WORM devices impose. The result is that integrating the WORM devices into current computer systems is extremely difficult and expensive. At present, only user-specific solutions have addressed these problems. As a consequence, the currently available optical storage options are not readily usable with a given computer system.

It is, therefore, an object of the present invention to provide a system to allow use of WORM media with the same ease as conventional storage devices.

It is another object of the present invention to provide a generally applicable solution to enable economical integration of WORM storage systems into existing computer systems.

It is a further object of the invention to provide a system which permits simplification of the tasks of integrating WORM media into a given computer system in a manner transparent to application software and at reduced cost and development time.

SUMMARY OF THE INVENTION

In accordance with the invention there is provided an apparatus for increasing the utility of a Write Once Read Many (WORM) storage medium.

The apparatus includes cache and WORM storage means for storing data. The apparatus further includes caching system controller means operatively coupled to the cache and WORM storage means for determining where in the cache storage means new data is to be written and which data currently stored therein is to be transferred to the WORM storage means to make room for the new data. In this way, the number of write operations to the WORM storage means is minimized and its efficiency increased.

In the preferred embodiment the cache and WORM storage means comprise magnetic and optical storage subsystems, respectively.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

FIG. 5 is similar to FIG. 4 and shows another embodiment of the inventive system;

FIG. 6 depicts in simplified form operation of a "link-list" system;

FIG. 7 depicts portions of cache storage with respect to which the operation of the LRW scheme as disclosed.

DETAILED DESCRIPTION OF THE INVENTION

Figure 1:
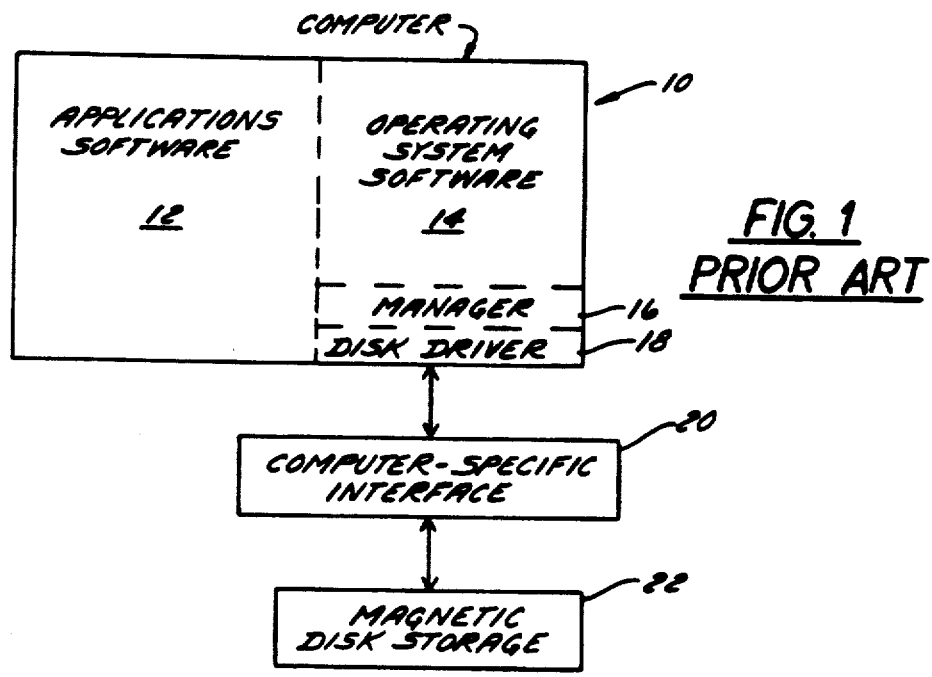
FIG. 1 depicts in block schematic form a computer system of conventional design.

Reference is made initially to FIG. 1 which depicts in block schematic form a conventional computer system 10, which may be thought of as being subdivided internally into at least two functionally separate parts identified in FIG. 1 as applications software portion 12 and operating system software 14. The applications software performs for the user the "useful" tasks, e.g., data analysis, which produce the desired end result. The operating system software is a utility program which performs "housekeeping" functions, such as timely storage and retrieval of data needed to execute the applications software. To this end, the operating system includes a manager portion 16 and a disk driver portion 18 which communicates through a computer-specific interface 20 with a magnetic disk storage 22, which may be in the form frequently referred to as "hard disk." Of course, storage 22 may be any other conventional magnetic storage medium, such as tape. Interface 20 is of known design but is specific to the particular computer 10 and magnetic disk storage 22.

The conventional way to integrate an optical storage device, such as a Write Once Read Many (WORM), into the conventional system of FIG. 1 is, as previously discussed, a complex task requiring substantial modification of the operating system software, including the manager and disk driver systems. Additional modification would be required to interface 20. These modifications would be different for each different type of computer, rendering the task difficult, time consuming and expensive. Moreover, WORM device would still have the drawbacks of a write-once medium discussed above.

Figure 2:
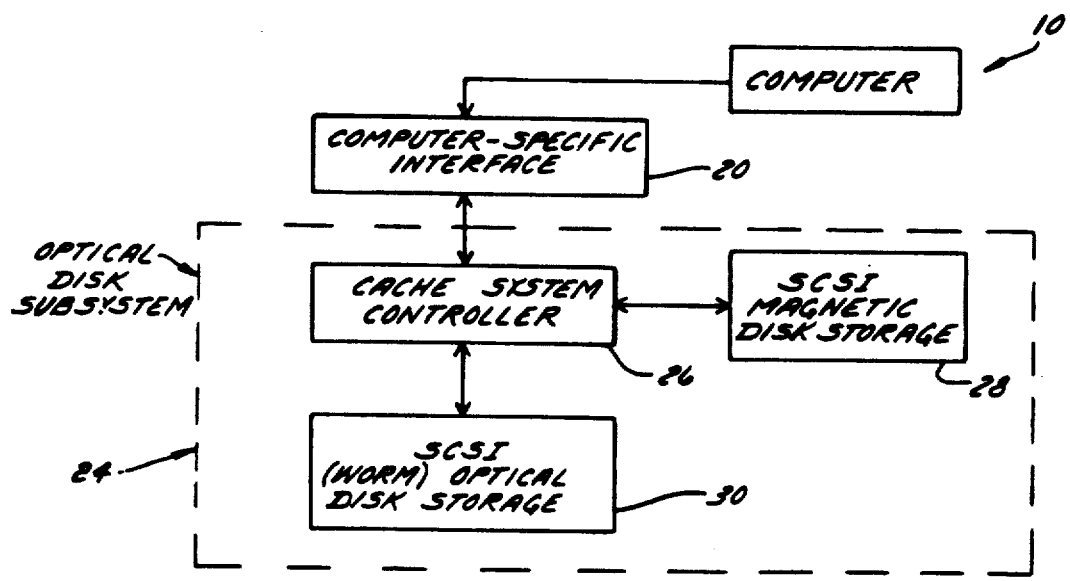
FIG. 2 illustrates in block schematic form an optical disk subsystem in accordance with the invention.

The manner in which, in accordance with the invention, the utility and ease of use of WORM media is improved is illustrated in FIG. 2, which depicts a block-schematic diagram of the system comprised of computer 10, interface 20 through which the computer communicates bidirectionally with an optical disk subsystem generally designated 24. The optical disk subsystem is made up of a caching system controller 26 which is linked bidirectionally with interface 20 and a Small Computer System Interface (SCSI) magnetic disk storage 28 and a SCSI optical disk storage (WORM) 30. It will be understood that magnetic storage 28 and optical storage 30 may comprise conventional devices, each including the necessary associated subsystems, as appropriate. It will be recognized, in accordance with the present invention, that optical disk subsystem 24 remains unchanged regardless of the type of computer 10 being used. A different computer interface 20 is, however, needed to render the computer compatible with the caching system controller. In this way, the optical disk subsystem is easily and economically integratable into any computer system without the need to modify the operating system software.

Caching system controller 26 will be described next in greater detail with reference to FIG. 3. The caching system controller includes a microprocessor 32 which communicates on a standard microprocessor bus 34 with a memory 36 and through a Small Computer System Interface 38 with SCSI magnetic and SCSI optical storage 28 and 30, respectively. Microprocessor 32 is also linked by means of bus 34 to computer 10 through interface 20.

Figure 4:
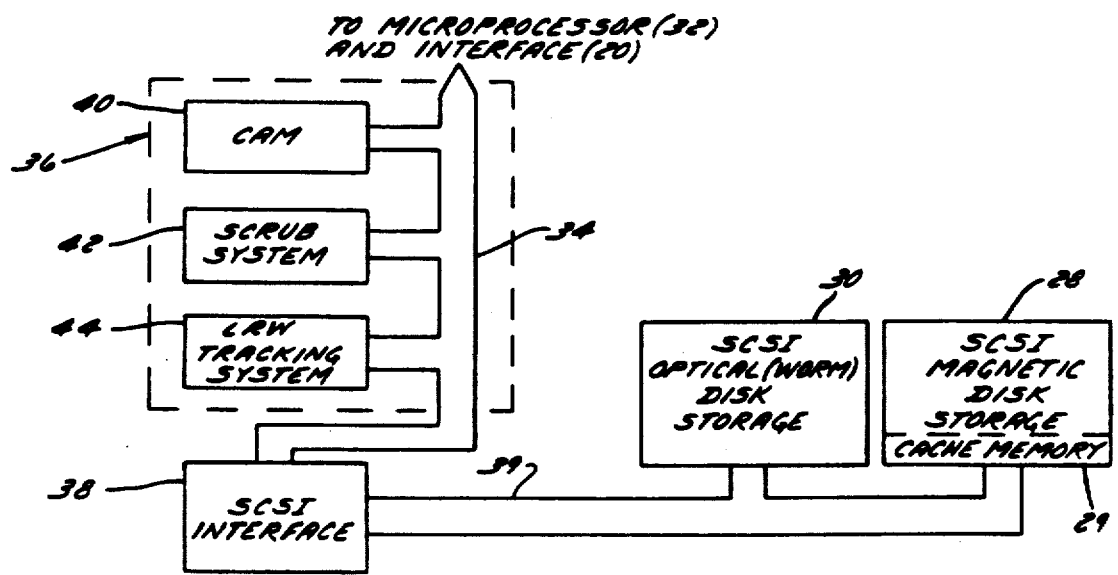

Functionally, memory 36 is organized as shown in FIG. 4. Memory 36 includes Content Addressable Memory (CAM) 40, scrub system 42 and Least Recently Written (LRW) tracking system 44, all of which are linked through bus 34. There are also shown in FIG. 4, optical disk storage 30 and a magnetic disk storage 28, where cache memory 29 resides, as will be more fully described hereinafter. Optical disk storage 30 and magnetic disk storage 28 communicate with the rest of the system through SCSI interface 38 on a bus 39. Magnetic disk storage 38 and optical disk storage 30 are functionally combined through caching system controller 26 to appear in operation as a single physical unit. This single unit has, as a whole, the attributes of being rewritable.

Figure 3:
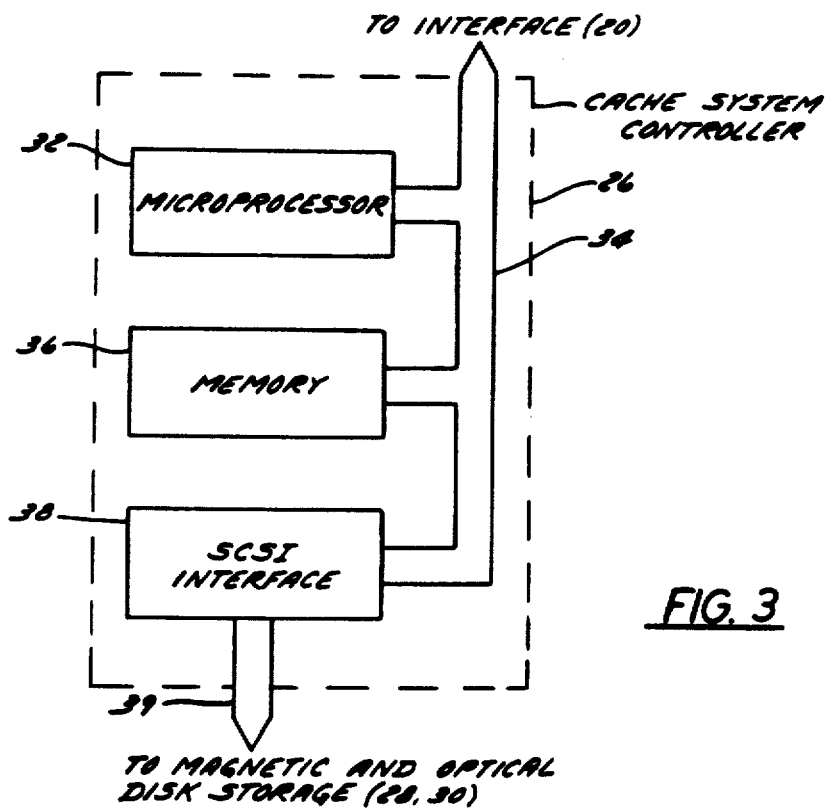
FIGS. 3 and 4 illustrate in greater detail the optical disk subsystem of FIG. 2.

FIG. 5 illustrates another embodiment of the inventive system similar to that disclosed with reference to FIGS. 3 and 4, but in which caching controller system 26 is connected to bus 39, on the "other side" of SCSI interface 38 (FIG. 4). Memory 36 remains configured as shown in FIG. 4, except that the bus connections are changed to those shown in FIG. 5. Operationally the system remains the same.

In operation, in accordance with the invention, the optical device is made to appear to be writable many times. This is accomplished by organizing operation of the above-described system in two parts. The first part includes cache storage 29 (FIG. 4) for data being written. The second part is a replacement mapping or some other conventional method for reassigning information to a new area. In the inventive system, the second part is performed in scrub system 42. The first part is somewhat analogous to the memory caches of the past. In much the same manner that such caches could make a slower memory appear to approach the speed of a conventional memory, so too, a write cache can be used to make the write-once optical subsystem appear to approach the writability of a conventional storage subsystem. Since the write cache will not achieve 100 percent efficiency, there will be eventually some information written to the optical subsystem that later will become obsolete and need to be replaced with new information. The replacement of old and obsolete information is achieved by conventional replacement mapping techniques. The basic concept is somewhat analogous to what are known as bad block mapping system, such as that used for bad media management on disk drives.

The basic concept of writing information to the optical disk subsystem and replacing such information as it becomes obsolete with new information will be described with reference to FIG. 6. FIG. 6 shows, by way of example, three units of storage 50-52 of an optical storage device each having address locations designated by numerals 53-55. In this example, units 50 and 51 contain previously transferred data which has become obsolete. Unit 52 contains valid data. In operation, a request for information directed to address 53 (unit 50) results in a transfer to address 54 (unit 51) and from there to unit 52 which, finally, contains valid data. When data in unit 52 becomes obsolete, address 55 will be updated to the address of the next unit which would contain the then valid data. Such a "link-list" can be, of course, expanded as needed.

The two parts (described above) of the inventive system, when combined, present a solution which allows WORM optical storage systems to be used in conventional ways by conventional computer systems. Because of the non-rewritable nature of WORM media, it is assumed that a true delete function cannot be implemented. This is normally not a problem since the primary use of an optical storage subsystem is for the permanent archiving of large data bases.

An important part of the inventive system is cache memory 29 (FIG. 4). However, it is important to recognize that in a conventional cache storage system the task of the cache is to reduce the number of accesses (both read and write) to a larger and slower storage medium. The cache storage is faster and the result is that the larger, slower storage will appear to approach the speed of the smaller, faster cache storage. In accordance with the invention, the task of cache memory is not to speed up access time, but to reduce and/or eliminate the necessity to rewrite data on the optical disk. This acts to increase the versatility of the WORM storage and makes it appear as being rewritable. An additional benefit is to increase the efficiency of the WORM medium due to inherent higher speed of magnetic disk storage 28, which contains cache memory 29.

The inventive system uses the Content Addressable Memory (CAM) 40 (FIG. 4) to keep track of what and where information is in cache storage 29 and also what is not in cache storage and therefore may be on the optical media 30. Only write operations to the optical system result in a modification/entry to the cache system CAM. What information is kept in cache and what information gets through to the optical storage system is controlled by a modified Least Recently Used (LRU) algorithm. In this system all write entries go to cache storage 29 and remain there until they become the least recently written information. At that time the entries are then written to the optical storage system. Because the goal is to cache the "write" operation, the LRU algorithm is modified to a Least Recently Written (LRW).

Briefly, the LRW tracking system utilizes a strategy which selects which sectors of the subsystem need to remain in cache storage and which are the best choice for retirement to optical disk storage. Thus, those cache storage sectors which have not been written for the longest time will be the first to be written to optical disk storage. Those sectors which have been written most recently will remain in cache storage. The decision is made on heuristic that the recent past is a good indicator of the near future. That is, those sectors which have not been written for the longest time are the most likely not to be written in the near future and, therefore, are good candidates for transfer to the optical storage system. The approximation of a LRW is based on the longest unwritten-first out. The sector being written to the optical storage subsystem will be cached in the magnetic disk at the location of the sector which has been unwritten for the longest time or one which has never been used.

The operation of LRW tracking system 44 (FIG. 4) will be briefly described with reference to FIG. 7 which depicts in simplified form five locations 58-62 in cache storage 29. Whenever a write operation is to be performed to cache storage 29, inquiries are made as to whether cache storage is full and whether data contained therein is valid. If the cache is not full, the write operation places data in the empty area. Similarly, if there is invalid (obsolete) data in cache storage the new data replaces the old data. If neither of these two conditions exists and a write operation must be performed, a determination is made as to which of the data in locations 58-62 is the oldest (least recently written). This old data is transferred to optical WORM storage and the new data placed in its location in cache storage. The LRW of the new data is designated as the most recently written and the address of the new data entered in CAM 40. Thus, if the new data is written into location 62, any subsequent data written would go to one of locations 58-61, depending on which is then the "oldest". This process is repeated continuously, so that only the oldest valid data is transferred to the optical disk.

In caching systems, it is called a "Hit" when the information for the current operation is in the cache storage and it is called a "Miss" when it is not. Typically, caching systems never achieve 100 percent Hit rates. Therefore, when the inevitable Miss happens and the optical system has older information which has been previously written, that information must be superseded with newer information. At this point the second part of the invention must take over and is performed in scrub system 42 (FIG. 4). The second part of assigning a replacement unit of storage for the originals can be done in many different ways. An example described hereinbefore uses link-lists. Many times this part of the system is implemented in the optical storage device itself. The second part of the inventive system is not new in and of itself and has been long used to reassign replacement areas when the media was defective.

Figure 8:
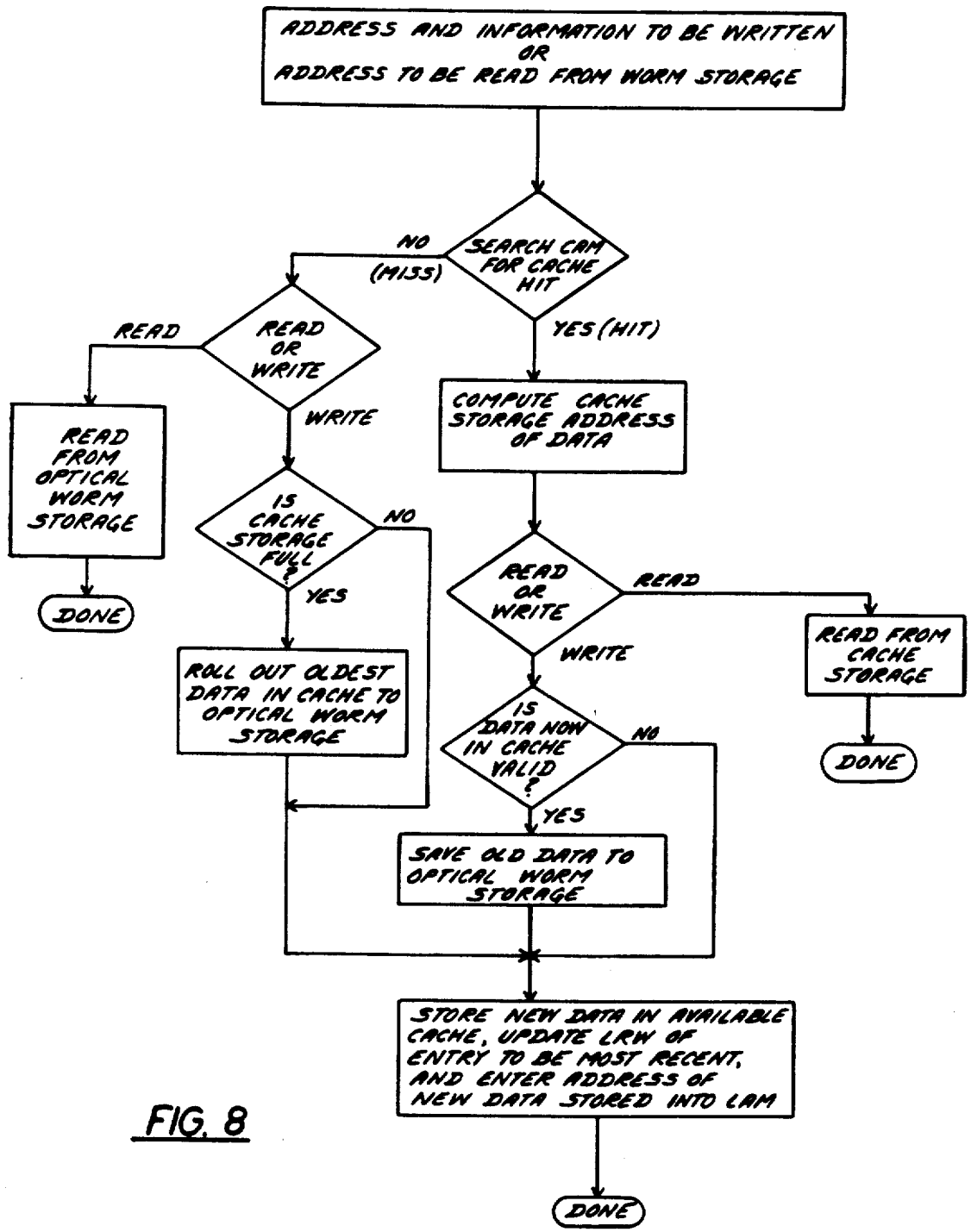
FIG. 8 depicts in flow-chart form the sequence of operation of the inventive system.

FIG. 8 illustrates in flow-chart form the sequence of operation of the inventive system and with reference to which a more detailed description of the invention will be made. The sequence of operation is initiated by receipt from computer 10 of either an address and information to be written or an address to be read from a WORM optical storage system. The next step in the functional sequence is a search conducted under direction of microprocessor 32 (FIG. 3) of the CAM memory 40 (FIG. 4) to determine whether the address sought is in cache storage 29 (HIT). Depending on what the result of the search is, the procedure splits into two logic paths.

If the search indicates that address is in cache (HIT), the address is computed. Next, a determination is made whether the operation is a "read" or "write". A "read" determination results in data being read from cache storage and the sequence terminates. A "write" determination requires replacement of old data in cache storage with the new data to be written. Prior to replacement of the old data in cache storage, a determination is first made whether the data in the location to be written is valid. If the data is valid, it must first be moved to optical WORM storage for possible later use. The new data is stored in the available cache storage space. This operation also updates the LRW index of the new entry to be most recent and enters the address of the new data into CAM memory. It should be noted that cache storage 29 resides on magnetic disk storage 28 (FIG. 4) so that all new data written into storage is actually written on magnetic medium which is reusable. This avoids writing all data into optical WORM device, as would be conventionally done in past systems, and thus avoids drawbacks associated therewith.

If the result of the CAM search for the received data address is negative (MISS) and the operation is a "read," data is read from WORM storage, thereby completing the operation.

If the result of the CAM search is a Miss and data is to be written, then (if the cache storage is full) the oldest valid data in cache storage is moved from cache storage to optical WORM storage, the new data/address is written into the emptied cache and CAM, and the LRW of the new entry is updated to be most recent. In this manner, only the data with the oldest LWR index is written into optical WORM storage, and conversely it serves to keep the most frequently used data in the magnetic cache storage.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A data storage device for use with a computer comprising:
   rewritable memory means for initially receiving direct from said computer and for storing all information units written to said storage device from said computer;
   non-rewritable memory means for storing information units received exclusively from said rewritable memory means; and
   control means coupled to both said rewritable memory means and said non-rewritable memory means for recognizing the condition that the number of said information units received direct from said computer and stored in the rewritable memory means is at a specified maximum level when a new information unit is to be written to said data storage device from said computer, said control means further comprising means for responding to said condition by moving the least recently written of said information units received direct from said computer from said rewritable memory means to said non-rewritable memory means to create a space in said rewritable memory means for said new information unit.

2. The device of claim 1 wherein said maximum level is the information unit storage capacity of said rewritable memory means.

3. The device of claim 1 wherein said control means includes:
a controller memory for containing a directory of the contents of said rewritable memory means; and
tracking means coupled to said controller memory for determining said least recently written information unit contained in said rewritable memory means.

4. The device of claim 1 wherein:
said device includes a bus for communicating address and data information between said storage device and an external device; and
said control means includes an interface for coupling said rewritable memory means, said non-rewritable memory means and said bus.

5. The device of claim 1 wherein said non-rewritable memory means comprises a WORM memory.

6. The device of claim 5 wherein said WORM memory includes mapping means for reassigning a location for storing rewritten information in said WORM memory.

7. The device of claim 5 wherein said WORM memory comprises an optical storage device.

8. The device of claim 1 wherein:
each of said new information units is written into said rewritable memory before being written into said non-rewritable memory; and
said control includes a memory for storing the addresses of said new information units written into said rewritable memory means.

9. The device of claim 1 wherein said rewritable memory means comprises a cache memory.

10. The device of claim 1 wherein said rewritable memory means comprises a magnetic storage system.

11. A method for storing and retrieving information units on a WORM memory system coupled to a computer, said WORM memory system including a rewritable portion and a non-rewritable portion, said method comprising the steps of:
initially storing all information units written to the WORM memory system from the computer in said rewritable portion;
determining whether said rewritable portion is filled to a specified maximum level when an information unit is newly received from the computer for entry into the WORM memory system; and
if said rewritable portion is found to be filled to said maximum level, transferring the least recently written of said information units initially stored in said rewritable portion from said rewritable portion to said non-rewritable portion to create space in said rewritable portion for said newly received information unit.

12. The method of claim 11 wherein said method includes the step of keeping a directory of the information unit stored in said rewritable portion in a content addressable memory and identifying the order in which said information units were written.

13. The method of claim 11 wherein said method includes the step of replacement mapping any information unit written in said non-rewritable portion which supersedes a unit previously written in said non-rewritable portion.

* * * * *